United States Patent [19]

Pasternack et al.

[11] 4,365,190
[45] Dec. 21, 1982

[54] AUTOMATIC VAR CONTROLLER

[75] Inventors: Henry J. Pasternack, Houston; Garry C. Keffer, Rosenberg, both of Tex.

[73] Assignee: ASI Systems, Inc., Stafford, Tex.

[21] Appl. No.: 245,685

[22] Filed: Mar. 19, 1981

[51] Int. Cl.³ .............................................. G05F 1/70
[52] U.S. Cl. .................................................. 323/211
[58] Field of Search ............... 323/205, 208, 209, 210, 323/211; 361/168, 169, 186

[56] References Cited

U.S. PATENT DOCUMENTS

| | | | |
|---|---|---|---|
| 2,295,388 | 9/1942 | Cuttino | 172/246 |
| 3,300,712 | 1/1967 | Segsworth | 323/209 |
| 3,391,329 | 7/1968 | Meyer | 323/209 X |
| 3,754,184 | 8/1973 | Stone | 323/210 |
| 4,068,159 | 1/1978 | Gyugyi | 323/211 |
| 4,104,576 | 8/1978 | Frank | 323/210 |
| 4,162,442 | 7/1979 | Frank | 323/210 |
| 4,204,150 | 5/1980 | Mathieu | 323/211 |
| 4,204,151 | 5/1980 | Gyugyi | 323/210 |

FOREIGN PATENT DOCUMENTS 54-11452  1/1979  Japan .................... 323/211

*Primary Examiner*—J. D. Miller
*Assistant Examiner*—Peter S. Wong
*Attorney, Agent, or Firm*—Vaden, Eickenroht, Thompson, Bednar & Jamison

[57] ABSTRACT

An automatic var control unit which monitors the reactive volt-amperes of a load on electrical lines, and continuously compensates undesired var by switching onto or from the lines of compensating capacitance. More particularly, the var condition on the electrical lines is sensed, converted into a representative analog voltage, which voltage is then amplified, compared and converted in logic circuits into a first binary pulse representing the need to add/remove capacitance. A flip-/flop logic circuit controls by a second binary pulse the addition or removal of capacitance. These binary pulses control the sequencing of relays that perform the actual switching of capacitors in the capacitor bank relative to the electrical lines. The capacitors in the capacitor bank can be switched in series or in binary progression, according to a program in the controller. As a result, the power efficiency of the lines is raised to above 90% by the automatic cancellation of the inductive load reactances.

20 Claims, 10 Drawing Figures

AUTOMATIC VAR CONTROLLER

BACKGROUND OF THE INVENTION

1. Field of the Invention

This invention relates to an automatic control unit that improves the power factor on electric lines subject to reactive loading, and more particularly, it relates to a system that adjusts capacitive reactance connected to electric lines.

2. Description of Prior Art

It is common place in most electric power lines, as for example the single phase two wire circuit, which serves a multitude of consumers for reactive loads to produce an unfavorable power factor. Stated in a different manner, air conditioners and heat pumps, air compressors and water pumps, etc. are large inductive reactances connected to power lines. The power factor can be adversely effected to a degree by these loads that the power companies apply a surcharge to power users adding large inductive loads to their power distribution system.

More particularly, the unit of reactive power in a circuit carrying sinusoidal current when the product of the root-mean-square value of the voltage, expressed in volts, by the root-means-square value of the current, expressed in amperes, and the sign of the phase angle between the voltage and current equals 1. This unit is abreviated as var, which is the unit for the commonly denoted term of the reactive volt-ampere.

Generally, some compensation must be provided the electric power lines whenever the var units deteriorate to a value of approximately 60% of the ideal. For this purpose, several automatic control systems exist which add or remove capacitors from the electric power lines in an attempt to bring the var unit value towards one. Many of these units operate automatically with fixed incremental additions of capacitance. Other units are semi-automatic with some manual attention required to insure that an excess amounts of capacitance were added to the power lines and thereby inducing a capacitive reactance problem to the electric power lines.

The present automatic var control unit is fully automatic but it can be operated manually and in either operating mode provides new functions and features not found in prior var control devices. More particularly, the present controller only responds to the actual var value on the electric lines and makes the addition or removal of capacitance from a capacitor bank on the lines in either series or binary progressions of programmed capacitance magnitudes. In addition, the present controller permits ready manual operation, if needed, with a direct visual readout of the watt and var condition values and the capacitors upon the electrical power lines.

SUMMARY OF THE INVENTION

In accordance with this invention, there is provided an automatic var controller for reducing a reactive power by compensating for inductive loads on electrical lines. The controller includes a transducer which connects to the lines and provides analog voltages representative of watt and var magnitudes. A readout device provides visual indication of the actual watt and var conditions on the lines. The analog var voltage is applied to a setpoint comparator which has internal selected var references and logic circuitry to provide binary event signals indicative of the need to change the capacitance connected to the power lines from a capacitor bank and whether to add capacitance or remove capacitance in certain magnitudes. The status of the capacitors connected to the lines and available for connection to the lines from the capacitor bank is provided by a second readout device. The binary event signals from the setpoint comparator is applied to a relay controller which selectively adds or removes capacitors from the line in accordance with a preselected program of series or binary progression in capacitor additions or removals. In addition, a programming system associated with a relay controller provides for the storage of the predetermined sequence in addition or removal of capacitors from the line in either the series or binary progression modes.

DESCRIPTION OF THE DRAWINGS

FIG. 7 is a circuit for manual control and capacitor status readouts or displays employed in the present controller;

In the drawings, the several embodiments of the present controller may have common elements of construction and circuitry. In regards to the several figures, like elements will carry like numerals to simplify description of these embodiments in the present controller.

DESCRIPTION OF PREFERRED EMBODIMENTS

Figure 1:
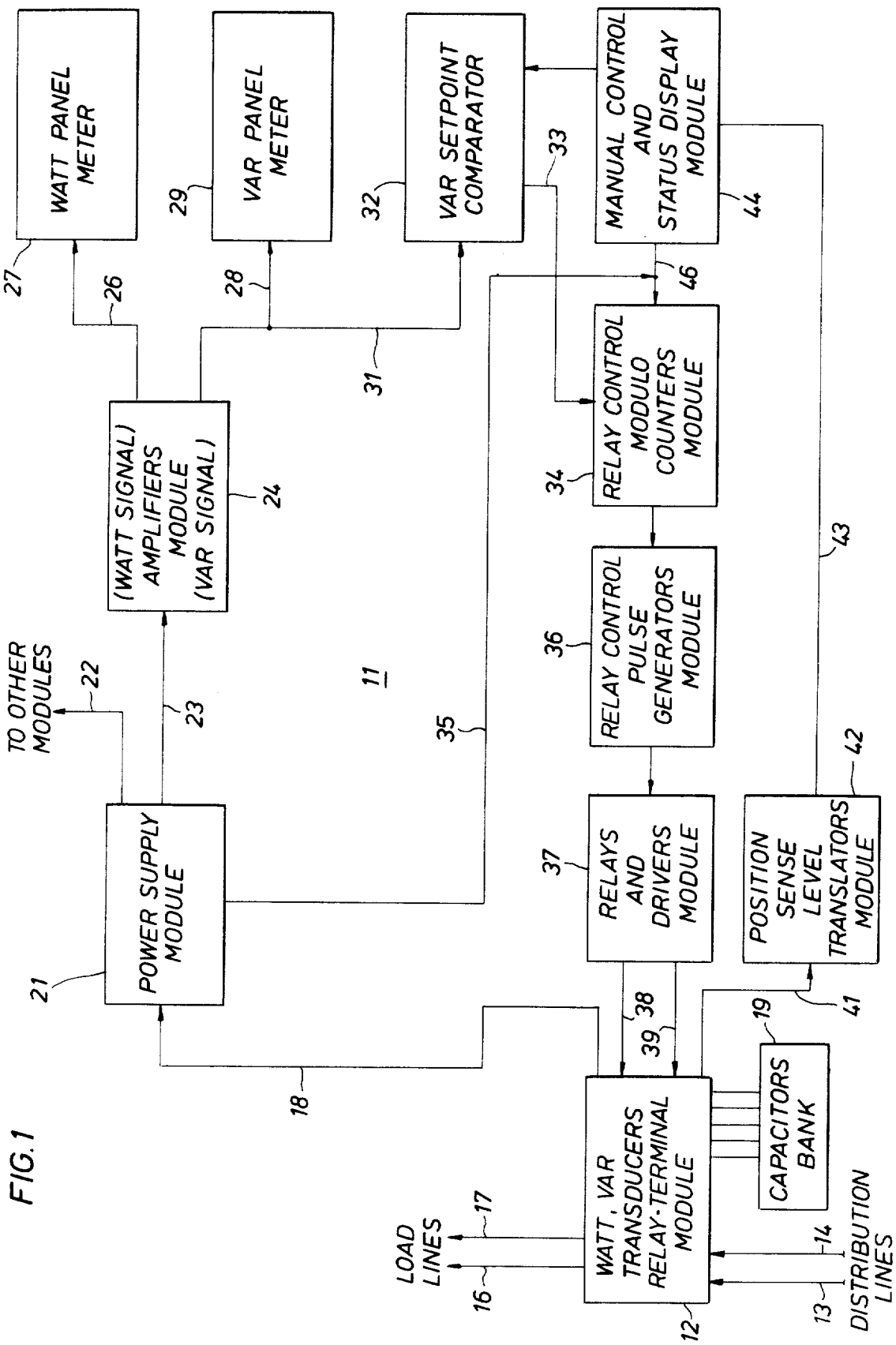
FIG. 1 is a schematic in a block diagram form of a preferred embodiment of the present automatic var controller.

Referring now to FIG. 1, there is shown in block type schematic an embodiment of the controller 11 which is arranged according to the present invention. The controller 11 has a terminal module 12 which is adapted to be interconnected in the power lines 13 and 14 distributing electrical power to the load lines 16 and 17 interconnected to the various loads including varying amounts of inductive reactance demands. The terminal module 12 also mounts transducers which produce a first analog voltage representative of the watts magnitude upon the electrical lines, and a second analog voltage representative of the var magnitudes on these lines. These transducers provide the several analog voltages by a signal bus 18 to the remainder of the controller 11. The terminal 12 provides a housing for various relays and other components which are adapted to interconnect of capacitors in a capacitor bank 19 with the distribution lines 13 and 14. The particular arrangement of these relays and other features associated with the switching of capacitors will be described more fully hereinafter.

The analog voltages on the bus 18 are supplied to a power supply module 21 which has a dual function in the controller 11. The analog voltages are passed through the module 21 in a voltage-current limiter circuit to protect the remainder of the circuitry from excessive voltages or current magnitudes other than these analog voltages. In addition, the power supply components therein provides on power bus 22 the various operating potentials and currents for the electronic components employed in the remainder of the circuitry. In addition, the power supply provides a reset power line 133 to control the various relay functions if desired, in manual operation of the controller 11. The analog watts and var voltages are passed by a bus 23 to an amplifier module 24 wherein a dual amplifier circuits are present to adjust the amplification gain on the signals to a level for subsequent utilization in the circuitry of the controller 11. The amplified watt analog signal is passed through a signal line 26 to a visual readout panel device 27 wherein is displayed the actual watts component on the electrical lines. In addition, the amplified var analog signal is passed through a signal line 28 to a visual readout panel 29 wherein there is a display of the actual var condition upon the electrical lines.

In the presently described circuitry, the transducers employed with the remote module 12 to produce the analog voltages and the module 21 may be of conventional design. The amplifier module 24 may be of conventional arrangement but preferably the amplifiers are of a special nature so that they are immuned to drift and various signal gain problems. The readout display devices 27 and 29 may be conventional, but preferably they are of the multidigit display such as provided by LEDs. For example, the readout display may show 0000 which is the occurance when the reactance unit approaches 1.

The amplified var analog signal is also sent from the amplifier module 24 through a signal line 31 to a unique var setpoint comparator 32 which provides dual logic control for the remainder of the circuitry. In the var setpoint comparator, the var analog voltage is compared to two internal var setpoints. If the var analog signal is above or below these setpoint var voltages, the comparator generates a first logic or binary signal which indicates the need to change the capacitance on the load lines 16 and 17. In addition the setpoint comparator 32 generate a second logic or binary signal which indicates the capacitance magnitude added or removed from the lines 16 and 17. These logic signals are sent on a signal conductor 33 to a relay control modulo counter module 34. This module 34 provides signals for relay control in either a series progression or binary progression of the addition and removal of capacitance from the capacitor bank 19 relative to the load lines 16 and 17. The output signals from the module 34 are passed to a relay control pulse generator module 36 which is programmed to provide coded pulsed signals. These coded pulse signals from the module 36 are applied to a relay and driver module 37 which provides the current signals for tripping and releasing of the several relays associated with adding or removing capacitors in the capacitor bank 19 of the load lines. These current signals are carried from the module 37 by current lines 38 and 39 to the module 12. The condition of the capacitor bank is sensed by secondary contacts upon the several relays. The information from these contacts indicates whether the particular relay is open or closed. This desired information regarding capacitor status in the bank 19 is conveyed by a signal conductor 41 to a position sense level translator module 42 for conversion into readout logic. The logic output of the module 42 is sent by an electrical signal line 43 to a manual control and status display module 44 which contains a visual readout of the status of the various capacitors in the capacitor bank 19, and whether they are in connection with the load line 16 and 17. The module 44 also provides for manually operating the relays associated with the capacitor bank 19 by synthetic signals sent through a signal line 46 to the relay control modulo counter module 34. Although several modules in the controller 11 may be conventional in design, the following description will highlight those components which are of novel arrangement for the purposes of this invention.

Figure 2:
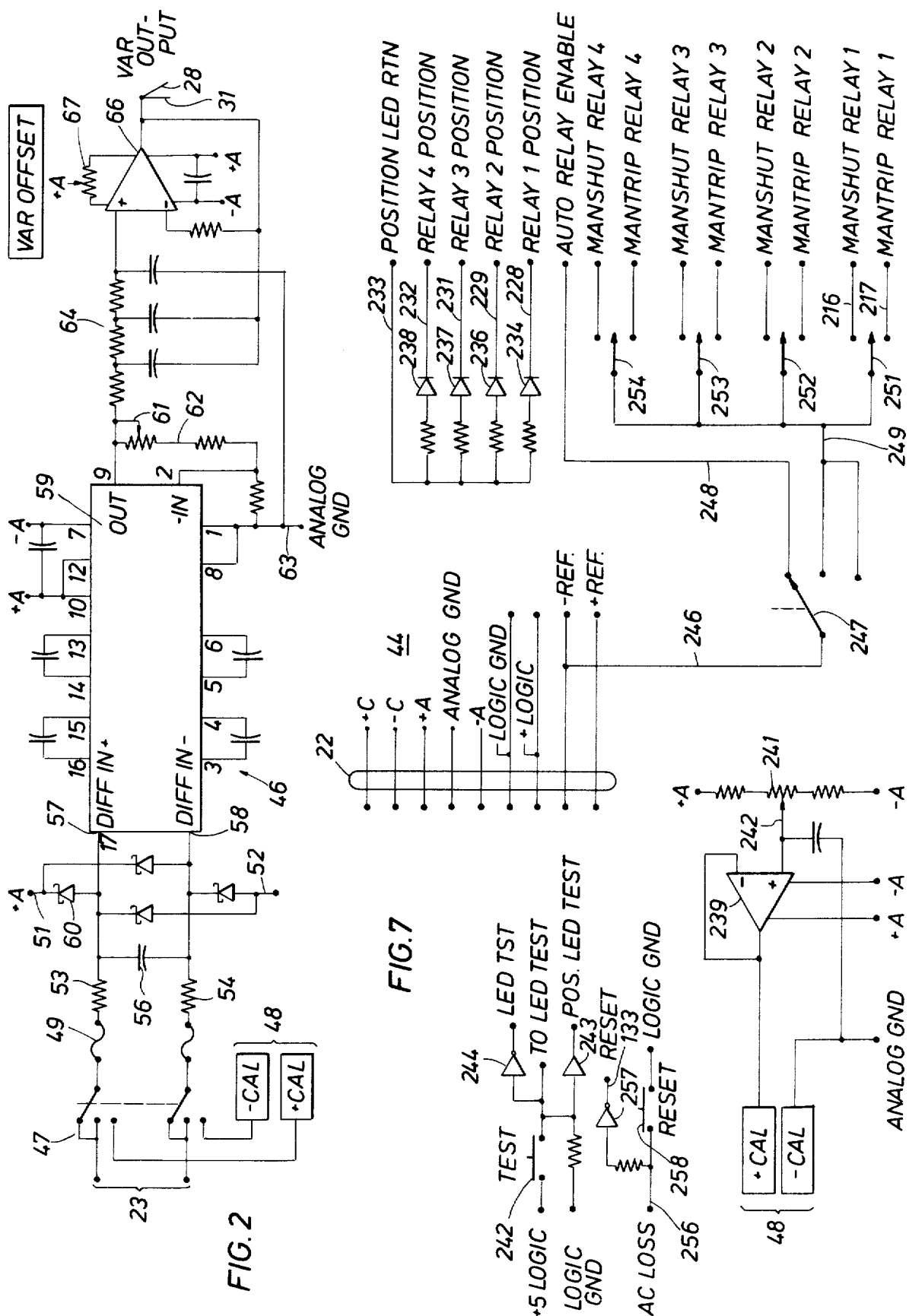
FIG. 2 is a circuit of a unique voltage amplifier employed in the controller of FIG. 1.

In reference to FIG. 2, there is shown a particular arrangement of the amplifier module 24 having side-by-side paths, one path for amplifying the watts analog voltage and a second path for amplifying the var analog voltage. Since these amplifier paths are substantially identical, only the amplifier will be described for use in connection with the var voltage analog. It is preferred to use a special amplifier 46 which requires only a gain control and a var offset control so as to operate without attention, throughout the dynamic range of the controller 11. More particularly, the var analog voltage on line 23 is applied to the amplifier 46 through input circuit 47 which also permits the calibration of the amplifier circuitry by switched connection with an external source of calibrating voltages 48. The input circuit includes a protected system employing fuses 49 with the usual capacitive and diode input filtering across a source of input biasing voltage provided at terminals 51 and 52. The input circuit contains a low pass filter with a cutoff frequency below the lowest variation oscillation in the analog voltage signal being applied at the input 47. The resistors 53 and 54 are capacitor 56 provide the low pass filter so that only substantially DC components are applied to the inputs 57 and 58 of a special amplifier 59. Preferably, the amplifier 59 is a commuting type autozero instrumentation amplifier. The multi terminals of the amplifier 59 are illustrated schematically with the usual bypass capacitances and sources of operating potential which may be arranged in a conventional manner. This particular instrumentation amplifier requires no trimming or ultra high accuracy in resister tracking and matching, and there are no external controls needed except for gain adjustment. Thus, this amplifier 59 incorporates automatic compensation for long term drift phenomena and temperature effects. The gain of the amplifier 59 is set by a variable potentiometer adjustment 61 in a feedback circuit 62 connected in its output. Adjustment of the potentiometer 61 presets the gain at a desired value from 1 to 1000 by appropriate selection of the resistances in the feedback circuit 62. The amplifier 59 is referenced to the analog ground 63 as a reference point. A low pass filter network 64 is connected to the output of the amplifier 59 and provides a band pass from DC to 10 Hz to remove any commutation spikes present in the output of this amplifier. The band pass signal is passed to the unity gain amplifier 66 which includes a potentiometer 67 for offset nulling of the effects of the filter network 64 on the amplified var analog voltage. The output of the amplifier 66 is routed to the signal lines 28 and 31 for use, respectively, in the readout display 29 and also in the var set point comparator 32. A comparable amplifier provides the amplified watts analog voltage on signal line 26 to readout display 27.

The described amplifier circuitry is of a special advantage in the present invention. It is uniquely stable and relatively immuned to drift or changes in gain because of temperature or dynamic voltage effects. In addition, the Schottky rectifiers 60 connected between the inputs 57 and 58 and the sources of potential 51 and 52 provide over voltage protection for amplifier 59. Thus, the amplifier 46 is set for a given amplification gain on the var analog voltage and will maintain a given amplified output over wide dynamic ranges and over long time periods irrespective to voltage or signal level changes. Thus, the amplifier 46 provides a unique stable circuit component for insuring that all signals to the remainder of the controller 11 are maintained at a fixed preset magnitude.

Figure 4:
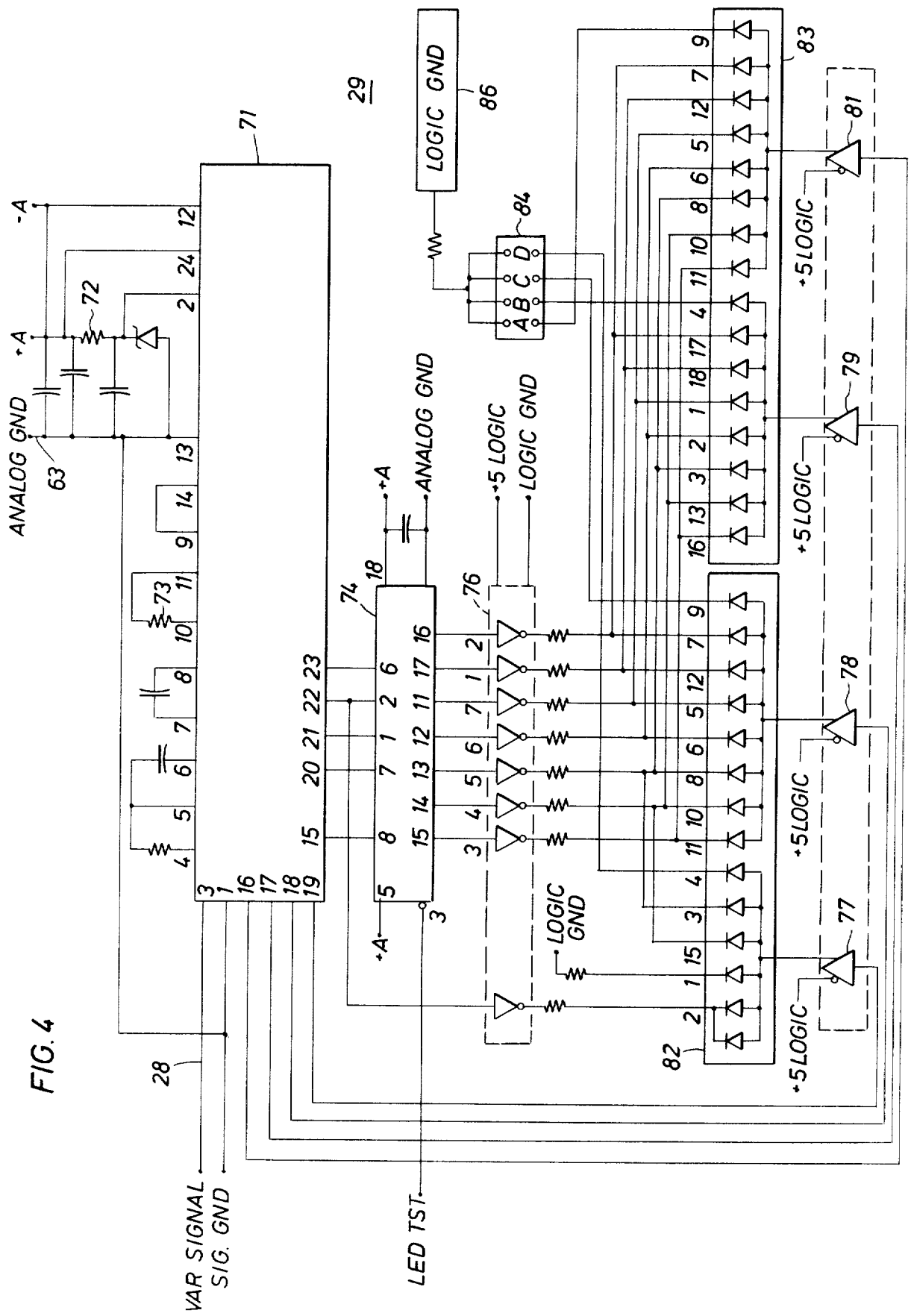
FIG. 4 is a circuit of a var or watt readout device employed in the present controller.

The amplified var analog voltage is utilized as input to var readout display. Referring now to FIG. 4, the readout display 29 includes an A/D converter 71 that receives its input on the signal line 28. The other input of converter 71 is the signal and analog ground 63. Thus, the amplifier converter 71 is floating relative to the other potentials in the circuitry of the controller 11 except for amplified var analog voltage. The A/D converter is preferably of the dual slope type with automatic zero correction and automatic polarity control. The converter 71 performs a ratiometric A/D conversion wherein the input var analog voltage on the signal line 28 is measured in ratio to a reference voltage "vars" which is applied at terminal 2 of the converter 71. The converter 71 has the usual connections for gain and linearity at the remaining terminals which include various resistances and capacitors for this effect. In addition, the converter 71 receives the power through a filtering network 72 on bus 22, from the power supply module 21.

The converter 71 in performing the desired ratio metric conversion, is adjusted so that the full scale voltage output display occurs when the input var analog voltage equals the reference var voltage. The readout device 29 is arranged when the clock pulsing system in the converter 71 therein has a full scale readout of some suitable value, for example 1999, which occurs when the input var voltage on signal line 28 in ratio to the reference voltage on terminal 2 is equal in ratio of 1 to 1999. This clock frequency may be adjusted by the resistor 73 which is connected between terminals 10 and 11 of the converter 71. At the end of a conversion period in the converter 71, the output thereof is pulsed to store the display logic on terminals 15-23. The stored logic representing display is in a binary format. A binary to multisegment converter 74 converts the binary code to the necessary multisegment code for controlling an LED display driver current sink 76. The converter 71 at terminal 16-19 connects to a plurality of switching amplifiers 77-79 and 81 that provide enabling signals to the displays 82 and 83. The displays 82 and 83 are connected through a suitable terminal 84 and logic ground 86 for completing the LED circuit. The displays 82 and 83 are preferably of the LED type providing at least 3½ digit displays of the actual var condition on the load lines. The terminal 84 provides for selection of a decimal point within the displays 82 and 83. The display 27 for visual readout of the actual watt condition of the load lines is substantially identical to the var display 29 except that some components are changed to provide a proper calibration in the clocking pulses to operate the A/D converter.

Figure 3:
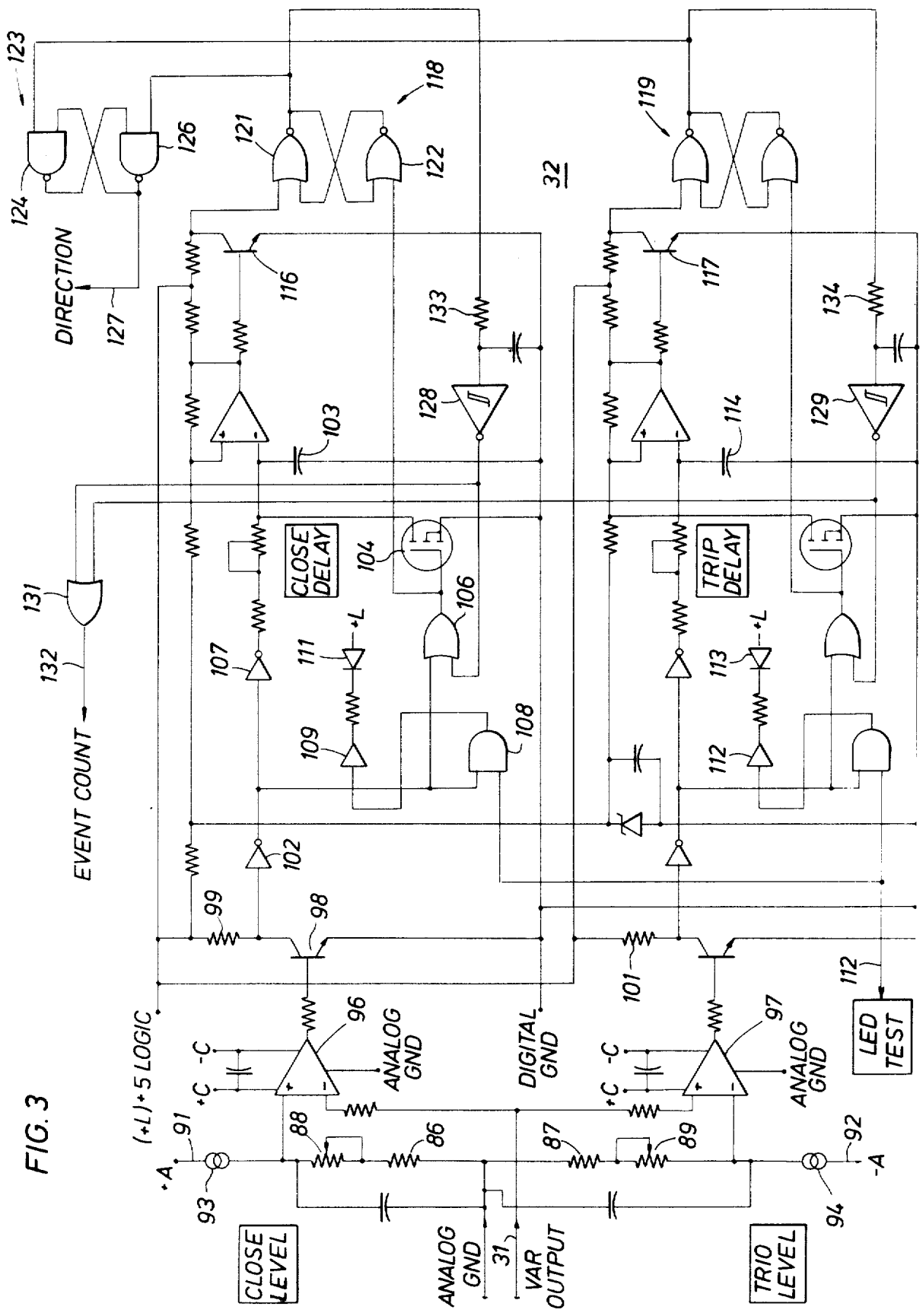
FIG. 3 is a circuit of a unique set point comparator employed in the present controller.

In FIG. 3, there is shown a preferred embodiment of the var setpoint converter 32 as employed with good results in the present invention. The setpoint comparator 32 receives as its input the amplified var analog signal from the amplifier 24. In the comparator 32, it may be assumed that a one milliamp signal on the signal line 31 corresponds to a readout of 1999 var. From experience or testing, the set points in the comparator 32 for adding or removing capacitance from the capacitor bank 19 may be set at plug 300 var and minus 150 var. With these parameters at hand, the resistance divider networks 86 and 87 are arranged with the potentiometers 88 and 89 between the sources of biasing potential 91 and 92 thru constant current sources 93 and 94 to produce this result. Thus, the amplified var signal is applied to one input of the amplifiers 96 and 97 which provide the positive var channel and the negative var channel, respectively. It will be apparent from the following description that each of these channels is actually a logic circuit. The amplifiers 96 and 97 have their other inputs connected across the resistor networks 86 and 87 so as to receive the predetemined positive var and minus var reference voltages representative of the var values for the addition and removal of capacitance from the capacitor bank 19 to the load lines. Since the positive and negative logic channels are identical and operate in parallel to generate the pulse event count or logic, (whenever capacitance to be added or removed), only the positive channel will be described. The output of the amplifier 96 is applied to the base of a transistor 98 which is arranged when the var signal is zero (or between the var reference voltages) to be in the conductive state. At this time, the current from the collector produces a voltage drop in across resistors 99 and 101. As a result, the inverter 102 has its output switched to logic 1 since its input is at logic 0. The capacitor 103 is held discharge because of the conduction through a VMOS N-channel transistor 104. At this time, the OR gate 106 has its output at logic 1. The output of the inverter 107 also discharges the capacitor 103 but not at the same rate as the transistor 104. The AND gate 108 drives the amplifier 109 to activate the LED 111 so as to indicate which of the two logic channels is in the logic 1 state. Obviously, the LED test line 112 is also at logic 1. Since the output of the amplifier 109 is also at logic 1, no current flows to illuminate the LED 111. The same condition exists in the amplifier 112 and the LED 113 of the negative or second logic channel following the amplifier 97.

At this time, both the positive channel capacitor 103 and the negative channel capacitor 114 are in a discharged condition. As a result, the transistors 116 and 117 are made conductive which makes the inputs both at logic 1 to a bi-stable multivibrators 118 and 119 in the positive negative channels, respectively. The multivibrators remain with their output at either logic 1 or 0, since they will remain in the logic state to which they were previously switched. The multivibrator 118 is provided by OR gates 121 and 122 which are connected in a conventional fashion of a flip/flop logic device. The output of the multivibrators 118 and 119 are applied to yet another flip/flop multivibrator 123 which is comprised of a first NAND gate 124 and a second NAND gate 126. The gates 124 and 126 are connected in the usual fashion to switch between logic 1 and 0 as both their inputs are switched to logic 1 or 0, or to the differential of logic 1 and 0. The output 127 (direction) of the multivibrator 123 will be at either logic 1 or 0, respectively, depending upon whether capacitance is to be added or to be removed from the capacitor bank 19 across the load lines. Assuming that each of the logic channels is in steady state condition, the output of the inverter 128 will be at logic 0. Simultaneously, the output of the negative channel inverter 129 will also be at logic 0 under these same conditions. If the amplified var analog voltage at input 31 is above or below the set point value, either channel may go to logic 0 at the outputs of inverters 128 and 129. At this time, the inputs to the OR gate 131 will be at logic 1 and logic 0, respectively. Therefore, the OR gate 131 is switched into logic 1 as the "EVENT COUNT" pulse upon the event signal line 132.

In order to insure that the capacitors 103 and 114 are in the completely discharged condition and to give the flip/flop circuitry sufficient time to reach a steady state of logic on output line 127, the input to the inverters 128 and 129 comprises an RC network 133 and 134, respectively, for providing a desired time constant function. Thus, depending upon the actual magnitude of the amplfied var analog signal at the input line 31, the logic line 132 may be either 0 or 1 or indicate respectively, no capacitance change or to the necessity of adding or removing capacitance from the capacitor bank 19 relative to the load lines. When logic 1 appears on the direction line 127, capacitance is to be added to the load lines. Conversely, logic 0 appears on line 127 when capacitance is to be removed from the load lines. Thus, there is a proper combination of the logic on the event count line 132 and also the logic on direction line 127 before the addition or removal of capacitance can actually occur relative to the load lines. Thus, if the line 132 is at logic 0, no addition of capacitance or removal of capacitance will occur. If the analog var signal on line 31 is above the positive var set point or below the negative var set point, then the logic line 132 is at logic 1 to indicate that a necessary correction of capacitance is required. Then, the system looks to the logic 1 or 0 condition upon the line 127 to determine whether to add or remove capacitance from the capacitor bank 19 relative to the load lines.

Figure 5:
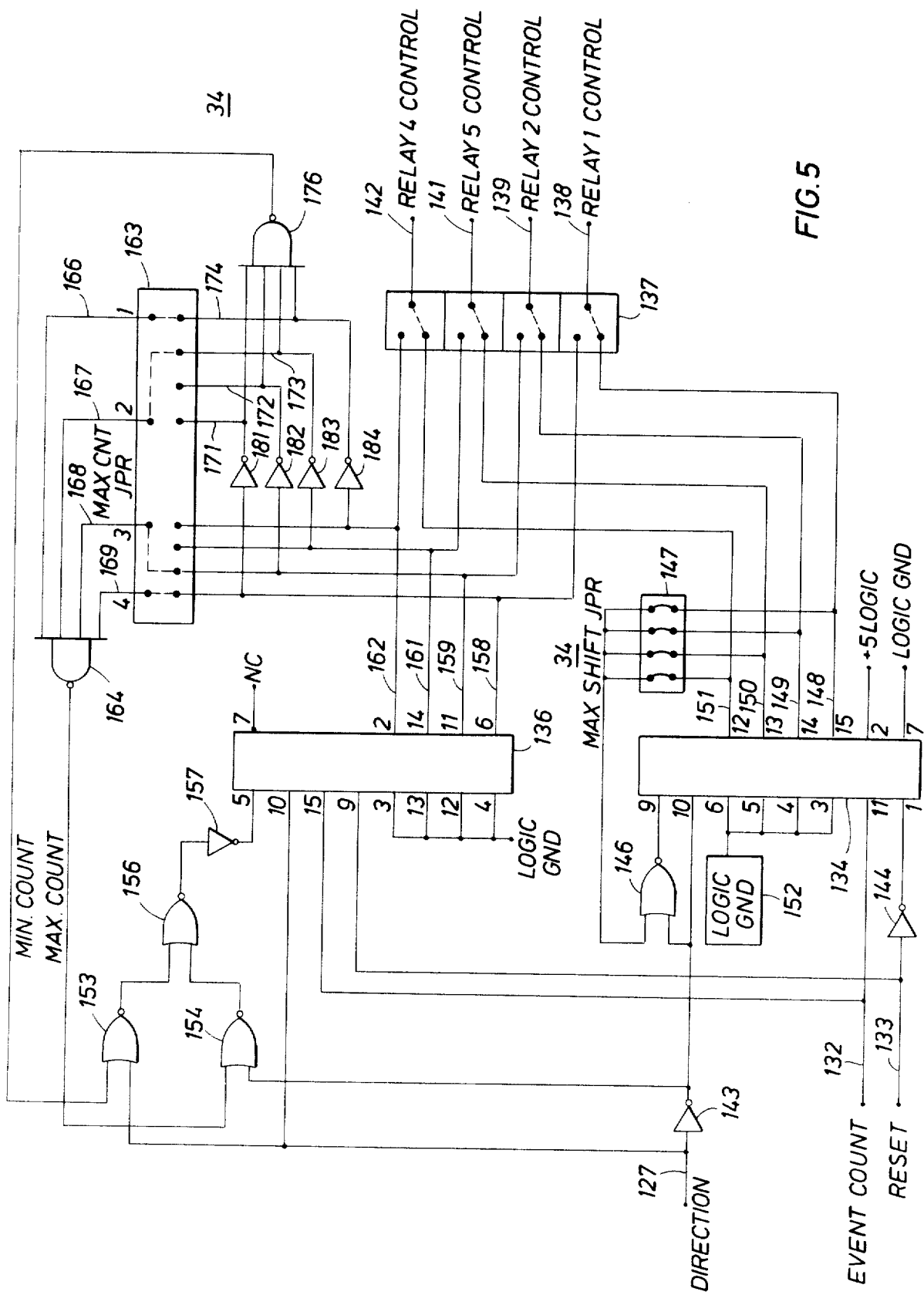
FIG. 5 is a circuit of a relay control modulo counter employed in the present controller.

The logic signals are passed from the setpoint comparator 32 to the relay control modulo counter module 34, which module is shown particularly in FIG. 5. The module 34 comprises a connection to the signal lines 127 and 132, and also to a DC signal reset line 133 which is taken from the power supply module 21. The module 34 comprises basically two relay switching systems in a first circuit for the series additions and removals of capacitance, which includes the shift register 134, and a second circuit which provides for the binary progression in addition or removal of capacitance which includes the binary counter 136. The first and second circuits are applied to a junction 137 which is illustrated as connected to signal lines 138, 139, 141 and 142 that provide, respectively the control signals for adding-/removing four capacitors in the capacitor bank 19. The junction 137 also includes a switch means to select either series or binary progression for addition and removal of capacitances from the capacitor bank 19. More particularly, the switching connections are shown as connected to the S or series terminals within the junction 137 for series progression of adding/removing capacitors. If the switching connection were connected to the B or binary terminals in the junction 137, a binary progression in addition or removal of capacitors would be arranged.

The first circuit provides the logic on the event count line 132 at one input terminal and the logic of the directional line 127 is applied to another input terminal of the shift register 134. An inverter 143 is in series with the direction logic line 127. A similar inverter 144 is in series with the reset line 133 to its input on the shift register 134. An OR gate 146 is connected with one input to the direction logic input of the register 134 and with its other input connected to a junction terminal 147. The junction terminal 147 is shown with jumpers in connection to the several register outputs 148, 149, 150 and 151 which are connected also to the junction 137. The remaining register inputs are connected to logic ground 152 and the the usual positive and ground logic circuits within the controller 11.

More particularly, the shift register 134 is preferably a 4-BIT bi-directional type for handling the four relay control lines 138, 139, 141 and 142 connecting to the junction 137. Whenever the event count line 132 is at logic 1, the OR gate 146 shifts the register 134 so that when there is a logic 1 or 0 on the direction line 127, the register will either count up or count down, respectively, stepwise through the several register outputs 148-151 and the relay control lines 138-139 and 141-142. Thus, the first circuit for series progression, adding or removing capacitances, occurs as the relay control lines 138, 139, 141 and 142 are either stepped up or down from their previous position. Therefore, the register 134 arrangement provides the necessary relay control functions for adding or removing in series progression the capacitances from the capacitor bank 19 or the load lines.

In the module 134, the junction 137 may be switched to the Binary terminals so that the capacitances are added or removed according to a binary weighted progression. For this purpose, the second circuit of the module 34 includes, for four capacitances in the bank 19, a 4-BIT binary up/down counter 136. The logic on the direction line 127 is applied as one input to an OR gate 153 and to the up/down terminal of the counter 136. The output from the inverter 143 is applied to a second OR gate 154. The outputs of the OR gates 153 and 154 are the inputs to an OR gate 156 which has an inverter 157 in its output for the control input to the counter 137. The outputs 158, 159, 161 and 162 of the register 136 are connected to the junction 137 at its terminals B. Also, these outputs are connected to a junction terminal 163 which has several interconnections as is shown by the chain lines. The terminals 166-169 are connected to the inputs of an AND gate 164 whose output is the second input to the OR gate 154. The junction 163 has a second similar group of connections 171-174 which are the inputs to an AND gate 176 whose output is the second input to the OR gate 153. In addition, these terminals 171-174 are interconnected by inverters 181-184 so as to provide the up/down stepping through the binary progression as required by the counter 136. Thus, the circuitry about the junction 163, in conjunction with the counter 136, provides for the stepping of the logic on lines 127 and 132 in a given up/down binary progression of capacitances (in 16 combinations thereof) through the relay control lines 138-141 and 142. As a result, these relay control lines are energized or deenergized as required to make the proper addition or removal of capacitance from the capacitor bank 19 by employing the relay control pulse generator module 36.

Figure 6:
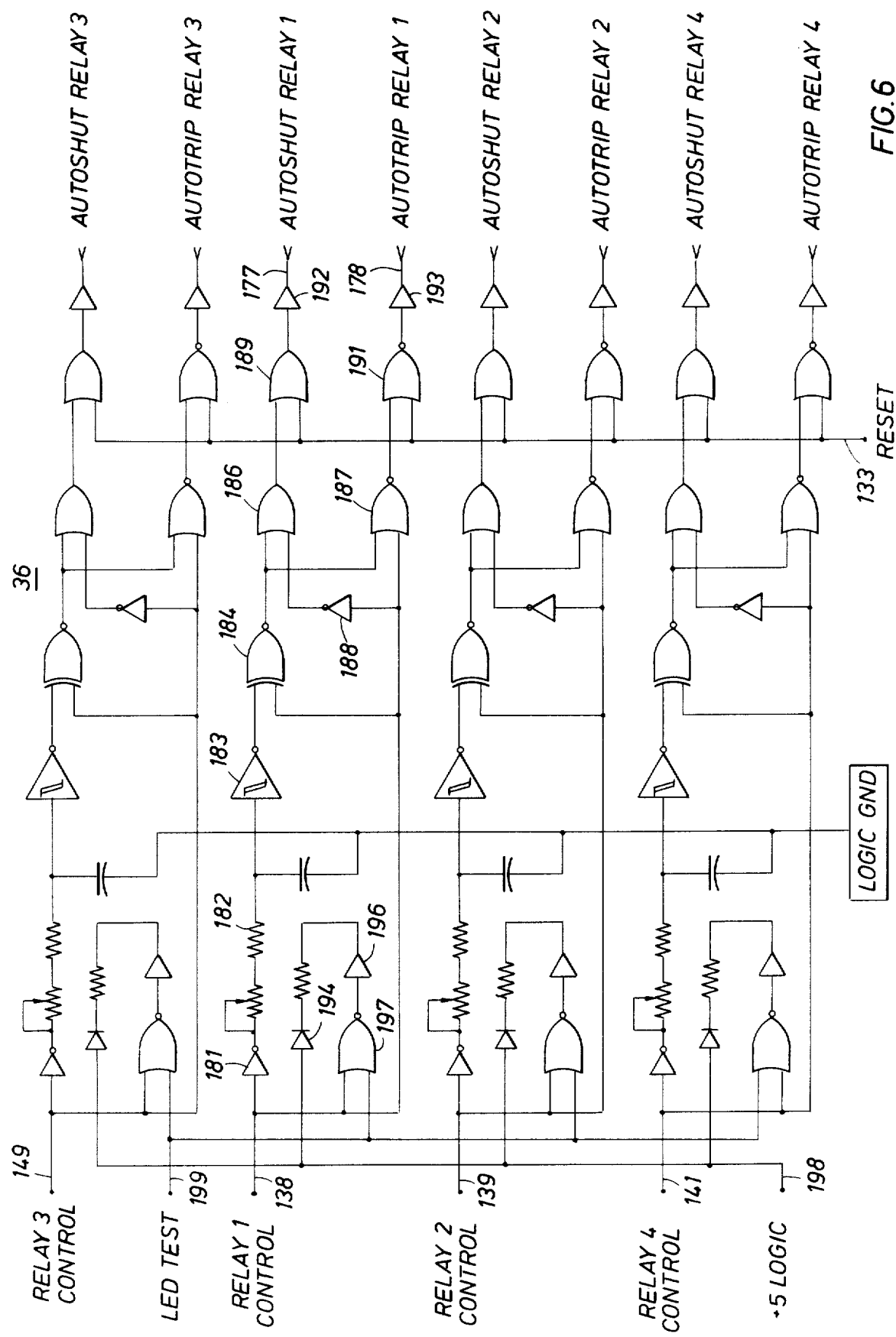
FIG. 6 is a circuit of relay control pulse generators employed in the present controller.

Referring now to FIG. 6, there is shown a circuit performing the necessary functions in the module 36. More particularly, this circuit has four parallel paths each of which is associated with one of the relay control outputs 138, 139, 141 and 142 of the module 34. Since these paths are identical, only the path associated with the relay output control line 138 and "relay 1" will be described in detail. In this path, the circuitry provides for producing relay control pulses which separately signal the closing or opening of a dual latching relay associated with a particular capacitance in the capacitor bank 19 using the autoshut relay line 177 or the autotrip relay line 178, respectively. In addition, there is provided a relay reset function through the reset signal line 133 from the power supply module 21.

The signal on the relay output line 138 is passed through an inverter 181, an RC network 182 and to the input to a Schmidtt-trigger 183. The output of the trigger 183 is the same logic as the input to the inverter 181 but there is a small time delay acquired in the RC network 182. The difference in timing appears across the inputs to a quad exclusive NOR gate 184 by a second input directly on the relay output line 138. As a result, logic 1 at the output of the NOR gate 184 places the OR gate 186 into logic 1 while the output of a second OR gate 187 goes to logic 0. The low inputs of the OR gates 186 and 187 are connected through an inverter 188 so as to insure that the gate 186 will be in logic 1 and the gate 187 will be in logic 0 during steady state signal conditions.

More particularly, when the inputs to the gate 184 are different, its output is at logic 0. When the inputs to the gate 184 are the same logic, the output is at logic 1. Then, logic 1 at the output of the gate 184 causes the output of gate 186 to be at logic 1 and the output of gate 187 to be at logic 0. As a result, the output of the OR gate 187 is forced to be logic 1 and the output of the OR gate 191 will be at logic 0, the same as the logic of the reset line 133. The outputs of the gates 189 and 191 are passed through amplifiers 192 and 193 and they become pulsed relay control signals in the autoshut and autotrip conductors 177 and 178, respectively. Thus, in the steady state condition of the module 36, the autoshut line 177 and the autotrip line 178 are at logic 1. If the reset line 133 is changed from logic 0 to logic 1, it will be apparent that the autoshut line 177 is forced to logic 1 and the autotrip line 178 is forced to logic 0 independent of all previous signals.

When the relay control line 138 goes from logic 1 to logic 0, the output of the trigger 183 remains at logic 0 for a short period of time before going to logic 1 while the output of the OR gate 184 goes promptly to logic 0. It will be remembered that the output of the gate 184 was at logic 0 just prior to the change of the line 138 from logic 1 to logic 0. Thus, the autotrip and autoshut lines 177 and 178 are both at logic 1, presuming there have been no reset pulses on the reset line 133. When the output of the gate 184 goes to logic 0, the output of the gates 186 and 187 also go to logic 0. Therefore, the relay control line 138 is at logic 0, the output of the gate 184 is also at logic 0, and the output of the gate 186 also goes to logic 0. Likewise, the relay control line 138 is at logic 1, the output of the gate 184 is also at logic 1, and the output of the gate 187 also goes to logic 0. As a result, when the relay control line 138 changes from logic 0 to logic 1, the autoshut relay line 177 is pulsed to a logic 0 for a short time period after the transition. When the relay control line 138 changes from a logic 1 to a logic 0, the autotrip relay line 178 is pulsed to a logic 0 for a short time period after the transition. This functioning is in the absence of logic 1 signal on the reset line 133. Thus, depending upon the prior logic on the relay control line 138, and whether the change is from logic 1 to 0 or conversely from 0 to 1, the relay control circuit in the module 36 provides the necessary pulsed signal to the autoshut and autotrip relay control lines 177 and 178 as needed to add or subtract capacitance from the capacitor bank 19 onto the load lines.

The condition of the "relay 1" associated with autoshut relay control line 177 and autotrip relay control line 178 is provided through a visual readout. This visual readout is provided by a LED 194 which is connected to the output of an amplifier 196 which receives its input signal through an OR gate 197. The OR gate 197 has its input connected between the relay control line 138 and the positive logic line 198. Thus, the LED will light whenever the relay control line goes from logic 0 to logic 1. This readout indicates the capacitance associated with the relay 1 is added to the load lines. The test LED connection 199 is interconnected with the LED test terminal 112 on the module 32 of the var set point comparator. As a result, the LED test circuit employed in the module 136 provides an external signal to test the proper operation of the several LED's.

Figure 8:
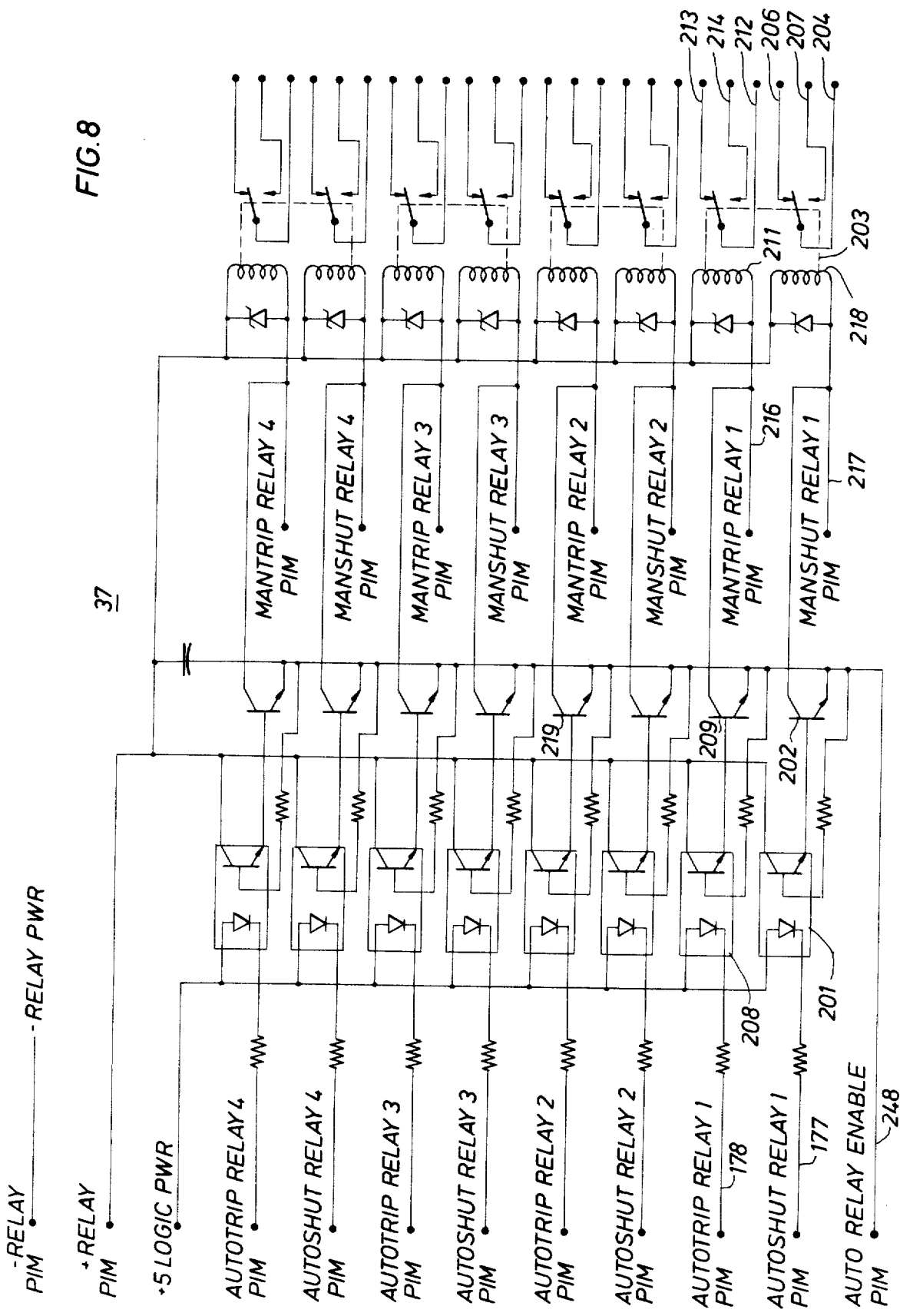
FIG. 8 is a circuit of relays and drives for controlling capacitor switching within a capacitor bank as employed in the present controller.

Referring to FIG. 8, there is shown a preferred embodiment of the relays and drivers module 37. As in the preceding module 36, only that circuit path associated with "relay 1" will be described as the other parts are identical. The relay autoshut and autotrip lines 177 and 178 are the inputs to the module 37. "Relay 1" is a latching, dual coil dual pole relay. The module 37 provides the proper current pulses to shut or trip the contacts on the relay responsive to the input on lines 177 and 178. The line 177 is connected to one input of an optical coupler 201 which has its other input connected in common to the positive logic terminal of the controller 11. The output of the coupler 201 is connected to a source of positive relay voltage and the emitter is connected to the base of a current transistor 202. An emitter feedback circuit connects the transistor 202 to the coupler 201 to control the output current flowing to its base. The collector of the transistor 202 is connected to one end of the coil 218 of a dual coil, dual pole, latching relay 203. The other end of the coil is connected to the positive relay voltage. The relay 203 has a common output 204 and pole connections 206 and 207 which form the closed and normally opened circuits, respectively. These connections 206 and 207 extend to terminal 12 at the capacitor bank 19 for the addition or removal of certain capacitors relative to the load lines. The autotrip relay line 178 is connected very similarly through a duplicate optical coupler 208 which drives a transistor 209 that operates a coil 211 in the relay 203. The coil 211 has a common output 212 and two pole connections 213 and 214 which are the closed and normally open circuits, respectively. In the relay 203, the connections 204, 206 and 207 controlling the switching of capacitors in the capacitor bank 19 whereas the connections 212, 213 and 214 activate low current status signaling systems to a manual control and status display module 44. The connections 204, 206 and 206 are interconnected to the capacitor bank 19 by the control lines 38 and 39, respectively. The relay 203 may be also actuated manually by applying a relay control voltage to the terminals 216 or 217 respectively, which will be described more fully in connection with the module 44.

It will be apparent that the relay 203 has a trip coil 211 and a shut coil 218. The positive sides of these coils are connected to a source of relay operating voltages. The negative sides of the coils are connected to the manual relay trip and shut terminals 216 and 217, and also to the collectors of transistor 202 and 209. When the controller 11 is in automatic operation, and the pulse on the autoshut line 177 goes to logic 0, current flows through the coupler 201 which makes the transistor 202 conductive and energizes the coil 218. As a result, the relay 201 is latched in trip or opened position. Conversely, when the pulse on autotrip relay line 178 goes to logic 0, the coil 211 is energized. Thereby, the relay 203 is latched in shut or closed position. The conductor 204 through the pole contacts to the conductors 206 and 207 provides switching of capacitors from the bank 19 on the load lines. If desired, these capacitor control functions may be made through the module 44 providing the proper voltage relay control current to the manual trip/shut relay terminals 216 and 217.

The remainder of the relay control circuits on the module 37 operate in exactly the same manner as those described in the circuitry relative to the relay 203.

The operation of module 37 is correlated to the operation of the relay control modulo counter 34 of FIG. 5 in the following manner. Assume that the junction terminal 147 in the module 34 is connected (as shown by the chainlines) in the maximum switching position for controlling four capacitors in the capacitor bank 19. The control logic on the lines 127 and 132 is effective for controlling the relays "1-4" on relay control lines 138, 139, 141 and 142.

As the direction logic shifts on line 127, the inputs to the register 134 will count up/down depending on whether the logic is 1 or 0. If for example, the relay 1 on relay control line 138 is closed to add a capacitor, and the logic is 1, the next or continuing logic 1 input makes the register 134 step up through the outputs 148-151 until the register is filled with all relays closed or sufficient capacitance is added to the load lines from the capacitor bank 19. At this time the logic 0 is on the line 132. Alternatively, a logic 0 on the line 127 causes the register to step down the outputs 151-148 until capacitance is removed from the load lines to correct the undesired var condition. The gate 146 momentarily switches the input to the register 134 (after each logic change on line 127) so that it is set-up for seeing the next logic signal on the line 127.

When there are four capacitors connected to the relays of module 37, in the binary mode, it can provide sixteen combinations of these capacitors from the bank 19. Assume the jumpers in the junction 137 of FIG. 5 are in the B binary position. The counter 136 is so arranged to "count" only if the output of the inverter 157 is at logic 0. If this input is at logic 1, then no count will occur in the counter 136. Therefore, the input of the counter 136 must be at logic 1 if the counter is counting down. Alternatively, the counter 136 must have the input at logic 0 if it is counting up. When the maximum count has been reached the logic 0 at the input keeps the register in steady state condition. As the counting up occurs, the binary count logic appears at the inputs to gate 164 to stop the count at the maximum count limit. Alternatively, as the counting down occurs, the binary count logic appears at the inputs to gate 176 to stop the count at the minimum count limit. By this arrangement, the register 136 can count up or down in a binary progression for the addition or removal of capacitors through signals in the relay control lines 138-142 which are subsequently interconnected by relays in the capacitor bank 19.

Figure 9:
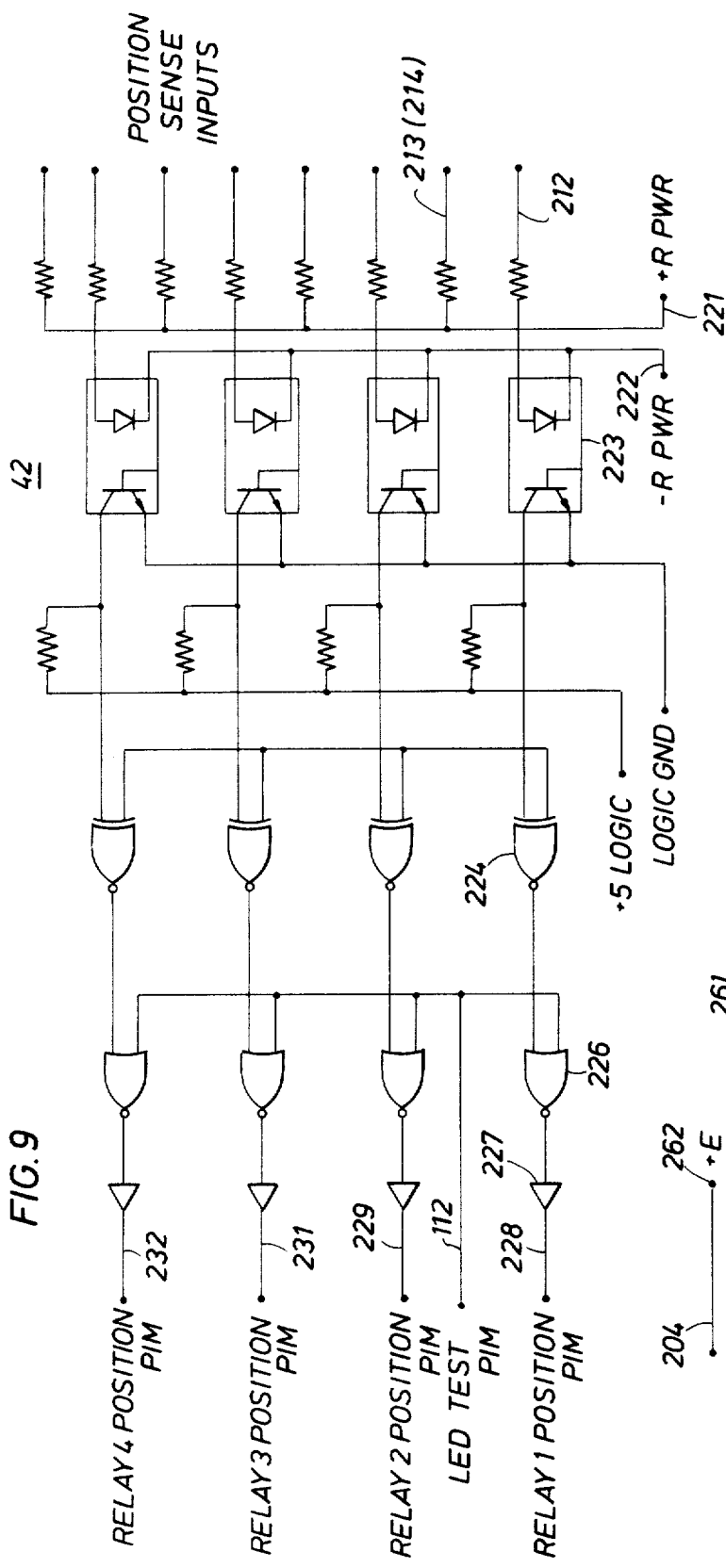
FIG. 9 is a circuit of position sense level translators employed in the present controller.

The condition of the capacitor bank 19 is determined and reported to the manual control and status display module 44 of FIG. 7 by the sense level translator module 42 of FIG. 9. More particularly, the module 42 receives sensing signals from the capacitor bank using auxiliary contacts on the relay 203, etc. For example, the control and pole contacts 212, 213 and 214 are inputs 228-229 and 231-232 to the translator module 42. As the auxiliary contacts on the relay 202 close, a voltage signal is passed from the relay power sources 221 and 222 through these relay contacts so that an optical coupler 223 is actuated. The coupler 223, provides input logic to the quad exclusive NOR gate 224. The output of the gate 224 is one input of an OR gate 226 which has its other input connected to the LED test terminal 112. Whenever the gate 226 has unlike logic at its inputs, an output signal is passed through amplifier 227 and then goes as a current signal to terminal 228 which extends from the module 42 to the remotely module 44 of FIG. 7. The condition of the relay 203 is indicated in module 44 by the illuminating a corresponding LED. Each of the other relays in a like circuit produces respectively a signal in lines 229, 231 and 232 and then a corresponding LED will light.

Referring now to FIG. 7, the manual control and status display module 44 is shown in its preferred embodiments. In this circuitry, the output terminals 228, 229, 231 and 232 from module 42 are connected in series with LEDS 234, 236, 237 and 238 and protecting resistances to the source of LED operating potential at conductor 233. When one of the relays, for example relay 203, is energized a current signal is passed on terminal 228 so that the LED 234 is illuminated. Thus, the condition of any relay associated with any particular capacitance in the capacitor bank 19 is readily indicated by the several LEDS associated with the module 44.

In addition, the module 44 provides a source of calibrating potential 48 which can be applied at the input of the amplifier 46 shown in FIG. 2. This calibrating potential 48 can be produced, for example, by an OP amplifier 239 which is connected to a source of bias potential across a resistance network 241 with an arm 242 providing for adjusting the proper magnitudes of calibration potential.

In addition, the module 44 may also include a source of potential to perform the LED test on the conductor 112. For this arrangement, the logic power source and ground are connected through a switch 242 to the LED test terminal, and the return 112 which includes an OP amplifier 243. The LED test returns through an inverter 244. The module 44 in addition may contain a switching arrangement so that the controller 11 is placed into automatic, manual or calibrating condition by a relatively simple circuit arrangement. More particularly, a source of negative reference voltage is provided from the power supply module 21 on line 246 and applied through a single pole multi throw switch 247 onto an auto signal line 248 which extends to the module 137 of FIG. 8 wherein it is connected to the emitters of the several transistors 202, etc. With the switch 247 in this position, the function of the controller 11 is automatic and provided fully by the various electronic control components associated with the circuitry.

When the switch 247 is placed into the manual setting, the negative reference potential is carried through the conductor 249 to the moveable contacts of a plurality of switches 251-254 which are associated with the manual shut and manual trip relay features carried on the module 44. More particularly, the switch 251 is connected to the conductors 216 and 217 of the module 37 so that when the switch 251 is thrown into manual shut position, the relay "1" is activated whereas with the switch 251 connected to the conductor 217, the relay "1" is subject to the manual trip functioning.

When the switch 247 is adjusted into the calibrate position the same condition essentially exists as in the manual setting. However, the various calibration adjustments in the circuitry associated with the controller 11 may be now made. The several LED readouts indicate the condition of the capacitor bank 19 varifying the proper functioning of the circuit. At this time, a reset potential is applied to line 133 from the power supply module 21 and through the conductor 256 and an inverter 257. The switch 258 is connected to the logic signal ground for the logic signal to be applied to the reset line 133. The reset line 133 with the switch 258 closed goes to logic 1 as long as the switch is maintained in its position. At this time, the proper operation of the several relays associated with the capacitor bank 19 are displayed by the LEDs 234-238. With the switch 258 released, the LED test switch 242 may be closed which illuminates all LED indicators in the entire controller 11. As a result, the module 44 not only provides for a visual readout of the capacitor condition of the capacitor bank, but it also provides a ready safety check for the entire controller 11 in the proper operation of the several relays, LED readout devices, and various auto relay functioning features.

Figure 10:
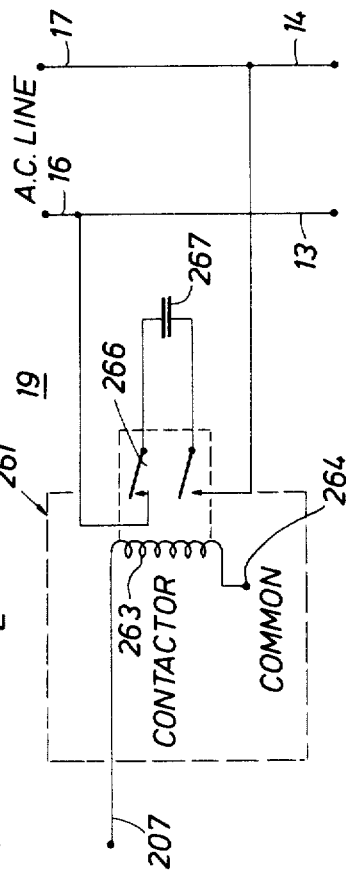
FIG. 10 illustrates the capacitor bank.

The capacitor bank 19 is shown in FIG. 10, but with only a single capacitor to be switched relative to the load lines by the relay 203 of the relay and driver module 37. More particularly, the relay 203 has the common output 204 and the normally open pole connection 207 extending to the terminal 12 and connected to the capacitor bank 19. In the bank 19, is a contactor 261 which has a coil 263 connected between the pole connection 207 and contactor power common 264. The common output 204 is connected to the other terminal of the power common 262 to complete the circuit in contactor 261.

The contactor 261 has multi pole, multi throw contacts 266 that are adapted to switch the capacitor 267 onto the load lines when the relay 203 is in closed or shut position. Alternatively, with the relay 203 in open or trip position, the capacitor 267 is removed from the load lines.

Although only one capacitor is shown that is added or removed to the load lines in the capacitor bank 19, it will be apparent that a multitude of capacitors can be switched in the same manner by the module 37 relative to the load lines.

From the foregoing, it will be seen that there has been provided herein, a novel automatic var controller which is well adapted for correcting conditions in an AC power circuit when the voltage and frequency are out of phase with each other due to substantial reactive loads being present on the load circuits. With the present controller proper addition or removal of corrective capacitative reactances prevent this wasteful flow of current to and from inductive loads. In particular, the present controller, can for any given inductive load condition, provide a proper compensating capacitive reactance to the power lines. In addition, the controller can change such compensating capacitive reactances either in a series or in a binary progression and in any desired orders of magnitude.

From the foregoing, it will be apparent that there has been provided a novel automatic var control unit which provides for the correction of power circuits having undesired reactive loads consuming power. It will be appreciated that certain changes and alterations can be made in the present controller without departing from the spirit of this invention. These changes are contemplated by and are within the scope of the appended claims which define the invention. Additionally, the present description is intended to be taken as an illustration of this invention.

What is claimed is:

1. An automatic var controller for reducing the reactive power by compensating for inductive loads on electrical lines, comprising:
   (a) transducer means connected to the lines and providing analog voltages representative of var magnitudes;
   (b) readout means giving visual readouts of the actual var conditions on the lines;
   (c) a set point comparator having as its input the analog voltage representative of var magnitude;
   (d) said set point comparator having internal selected positive and negative var values and circuitry providing output binary signals indicative of a needed change in capacitance connected to the lines and for adding or removing capacitance in certain magnitudes;
   (e) second readout means giving a visual readout of the status of capacitors connected to the lines and available for connection to the lines;
   (f) relay control means receiving the binary signals from said set point comparator for selectively adding and removing capacitors on the lines in accordance with a preselected series or binary program; and
   (g) programming means associated with said relay control means for storage of the predetermined sequence in the adding and removing capacitors on the lines.

2. The automatic var controller of claim 1 wherein said set point comparator has first and second channels for providing a binary event pulse when the var value indicates the need for adding or removing capacitance on the lines.

3. The automatic var controller of claim 2 wherein said first and second channels provide said binary event pulse indicating the need for adding or removing capacitance on the lines to a flip/flop circuit including a bi-stable multivibrator for producing a binary signal indicative of either adding or removing capacitance on the lines.

4. The automatic var controller of claim 1 wherein said set point comparator has a pair of channels for providing a binary event pulse when the var value indicates the need for adding or removing capacitors on the lines and the binary event pulse is the input to a flip/flop circuit including a bi-stable multivibrator for providing a binary signal indicative of either adding or removing capacitance on the lines.

5. The automatic var controller of claim 1 wherein said set point comparator includes logic channels for providing a binary event pulse as 1 or 0, respectively when the var value indicates the need for adding or removing capacitance on the lines.

6. The automatic var controller of claim 1 wherein the binary signals from said set point comparator are applied to a flip/flop circuit including a bi-stable multivibrator that produces a binary signal indicative of either adding or removing capacitance on the lines.

7. The automatic var controller of claim 1 wherein said set point comparator includes logic channels for providing a first binary event pulse of 1 or 0, respectively, when the var value indicates the need for adding or removing capacitance on the lines, and the first binary pulse is applied to a flip/flop circuit including a bi-stable multivibrator that produces a second binary pulse of 1 or 0, respectively, when the var value indicates adding or removing capacitance on the lines.

8. The automatic var controller of claim 7 wherein said relay control means has a first input receiving said first binary pulse and thereby selectively switches the necessary capacitance magnitude and by a second input receiving said second binary pulse for selectively adding or removing the necessary capacitance magnitude on the lines.

9. The automatic var controller of claim 8 wherein said relay control means includes switch means for selection of series and binary additions or removal of capacitance on the lines, and counter means actuated thereby, whereby in series selection there is a serial progression in capacitors in a capacitor bank, and in binary selection there is a binary progression in binary weighted magnitudes in capacitors in the capacitor bank.

10. An automatic var controller for reducing the reactive power by compensating for inductive loads on electrical lines, comprising:
(a) transducer means connected to the lines and providing an analog voltage representative of var magnitudes;
(b) a set point comparator having as its input the analog voltage representative of the var magnitude;
(c) said set point comparator having internal preset positive and negative var values and including first and second logic channels for providing a first binary event pulse of 1 or 0, respectively when the var value exceeds the preset positive and negative var values thereby indicating the need for adding or removing capacitance on the lines;
(d) said setpoint comparator having a flip/flop circuit including a bi-stable multivibrator with said first binary event pulse as an input and producing a second binary event pulse of 1 or 0 respectively, indicating the adding or removing capacitance on the lines;
(e) relay control means including switching means for connecting capacitance from a capacitor bank with the lines; and
(f) said switching means having a first circuit means actuated by said first binary event pulse for the selection of necessary capacitance from the capacitor bank and a second circuit means actuated by said second binary event pulse for the addition or removal of the necessary capacitance on the lines.

11. The automatic var controller of claim 10 wherein said relay control means in said switching means provides for selection of series and binary progressions of capacitance from said capacitor bank.

12. The automatic var controller of claim 11 wherein said switching means includes a counter means actuated thereby wherein in series selection there is a serial progression in capacitors in said capacitor bank and in binary selections there is a binary progression in binary weighted magnitudes in capacitors in said capacitor bank.

13. An automatic var controller for reducing the reactive power by compensating for inductive loads on electrical lines, comprising:
(a) transducer means connected to the lines and providing an analog voltage representative of var magnitudes;
(b) a set point comparator having as its input the analog voltage representative of the var magnitude;
(c) said set point comparator having internal preset var values and including first and second logic channels for providing a first binary event pulse of 1 or 0, respectively, when the var value indicates the need for adding or removing capacitance on the lines;
(d) said setpoint comparator having a flip/flop circuit including a bi-stable multivibrator with said first binary event pulse as an input producing a second binary event pulse of 1 or 0 respectively, indicating the adding or removing capacitance on the lines;
(e) relay control means including switching means for connecting capacitance from a capacitor bank with the lines;
(f) said switching means having a first circuit means actuated by said first binary event pulse for the selection of necessary capacitance from the capacitor bank and a second circuit means actuated by said second binary event pulse for the addition or removal of the necessary capacitance on the lines; and
(g) said setpoint comparator including a cylic switch for shifting said first binary event pulse from 1 to 0, or 0 to 1, as the case may be, after a predetermined time period whereby said first binary event pulse is repeated time-wise as capacitance magnitudes from said capacitor bank are removed or added on the lines until the var has a value of approximately 1.

14. The automatic var controller of claim 10 wherein a readout means actuated by the analog voltages representative of var magnitudes for producing a visual readout of actual var conditions on the lines.

15. An automatic var controller for reducing the reactive power by compensating for inductive loads on electrical lines, comprising:
(a) transducer means connected to the lines and providing an analog voltage representative of var magnitudes;
(b) a set point comparator having as its input the analog voltage representative of the var magnitude;
(c) said set point comparator having internal preset var values and including first and second logic channels for providing a first binary event pulse of 1 or 0, respectively, when the var value indicates the need for adding or removing capacitance on the lines;
(d) said setpoint comparator having a flip/flop circuit including a bi-stable multivibrator with said first binary event pulse of 1 or 0 respectively, indicating the adding or removing capacitance on the lines;

(e) relay control means including switching means for connection capacitance from a capacitor bank with the lines;

(f) said switching means having a first circuit means actuated by said first binary event pulse for the selection of necessary capacitance from the capacitor bank and a second circuit means actuated by said second binary event pulse for the addition or removal of the necessary capacitance on the lines;

(g) a readout means actuated by the analog voltages representative of var magnitudes for producing a visual readout of actual var conditions on the lines; and (h) said readout means comprising an A/D converter for producing a ratiometer conversion of the var analog voltage to a reference voltage, and said readout means having a full scale output when the var analog voltage is maximum.

16. The automatic var controller of claim 15 wherein the ratiometer conversion in the A/D converter is produced by a clock pulsing system wherein the full scale output is equal to a maximum count of 1999 in said clock pulsing system.

17. The automatic var controller of claim 16 wherein the output from said A/D converter is in binary format which output is applied as the input to a binary-to-multisegment converter having in its output a LED display providing multidigit readout display directly of the actual var conditions on the lines.

18. An automatic var controller for reducing the reactive power by compensating for inductive load on electrical lines, comprising:

(a) transducer means connected to the lines and providing an analog voltage representative of var magnitudes;

(b) a set point comparator having as its input the analog voltage representative of the var magnitude;

(c) said set point comparator having internal preset var values and including first and second logic channels for providing a first binary pulse event pulse of 1 or 0, respectively, when the var value indicates the need for adding or removing capacitance on the lines;

(d) said setpoint comparator having a flip/flop circuit including a bi-stable multivibrator with said first binary event pulse as an input and producing a second binary event pulse of 1 or 0 respectively, indicating the adding or removing capacitance on the lines;

(e) relay control means including switching means for connecting capacitance from a capacitor bank with the lines;

(f) said switching means having a first circuit means actuated by said first binary event pulse for the selection of necessary capacitance from the capacitor bank and a second circuit means actuated by said second binary event pulse for the addition or removal of the necessary capacitance on the lines; and (g) the analog voltage representative of the actual var conditions on the lines is the input signal to a commutating auto-zero amplifier including a gain control and havings its output applied to a unity gain, low pass filtering amplifier with offset nulling, and the output thereof is the analog var voltage applied as the input signal to said set point comparator whereby the analog voltage representative of var magnitudes is amplified at fixed gain with automatic compensation for long term drift phenomena and temperature effects.

19. The automatic var controller of claim 18 wherein a calibration amplifier provides a synthetic analog voltage representative of a certain var condition on the lines as a substitute signal to the input of said commutating auto-zero amplifier whereby the operation of said readouts and other components of the var controller can be determined.

20. An automatic var controller for reducing the reaction power by compensating for inductive loads on electrical lines, comprising:

(a) transducer means connected to the lines and providing analog voltages representative of watts and var magnitudes;

(b) first and second commutating auto-zero amplifiers having as their inputs the analog voltages representative of watts and var magnitudes, respectively;

(c) each said amplifier including a gain control and having its input applied to a unity gain, low pass filtering amplifier with offset nulling;

(d) said first amplifier having as its output an amplified analog voltage representative the watts magnitude;

(e) said second amplifier having as its output an amplified voltage representative of the var magnitude;

(f) readout means connected to the output of said first and second amplifiers and providing a visual digit readout of the actual watts and var conditions on the lines;

(g) said readout means including an A/D converter which provides a ratiometer convertion by clock pulsing system having full scale output at a ratio of 1 which is equal to a preset maximum clock pulse count, and said A/D converter having an output in a binary format which is applied as the input to a binary-to-multisegment converter having as its output a LED display providing a multidigit readout display directly as the actual watts and var conditions on the lines, (h) a set point comparator having as its input the amplified var voltage signal from said second amplifier;

(i) said set point comparator including logic channels for providing a first binary event pulse as 1 or 0, respectively, when the var value indicates the need for adding or removing capacitance from a capacitor bank, and a flip/flop circuit including a bistable multivibrator that produces a second binary event pulse indicative of either adding or removing capacitance from said capacitor bank;

(j) relay control means including switching means for connecting capacitors from said capacitor bank with the lines;

(k) said switching means having a first circuit means actuated by the first binary event pulse for the selection of necessary capacitance magnitudes from said capacitor bank and a second circuit means actuated by said second binary event pulse for the addition or removal of the necessary capacitance magnitudes from said capacitor bank to or from the lines;

(l) said switching means providing for selection of series and binary addition or removal of capacitance from said capacitor bank, and said switch means including a counter means actuated thereby wherein in series selection there is a serial progression in capacitor connections in said capacitor bank and in binary selection, there is a binary progression in binary weighted magnitudes in capacitor connections in said capacitor bank; and, (m) said set point comparator including a cylic switch for shifting the first binary event pulse from 1 to 0 or, 0 to 1, as the case may be, after a predetermined time period whereby said first binary event pulse is repeated time-wise as capacitor magnitudes in said capacitor bank are removed or added on the lines until the var condition has a value of approximately 1.

* * * * *